United States Patent [19]

Migliore

[11] Patent Number: 4,601,147
[45] Date of Patent: Jul. 22, 1986

[54] ASSEMBLY SYSTEM FOR INSTALLING MARBLE PANELS

[76] Inventor: Neil Migliore, 234 New York Ave., Huntington, N.Y. 11743

[21] Appl. No.: 766,270

[22] Filed: Aug. 16, 1985

[51] Int. Cl.⁴ .................... E04F 13/08; E04F 13/00
[52] U.S. Cl. .................... 52/275; 52/309.13; 52/384; 52/385; 52/506; 52/612
[58] Field of Search ............... 52/309.13, 309.17, 386, 52/384, 385, 811, 612, 506, 275

[56] References Cited

U.S. PATENT DOCUMENTS

| Re. 21,278 | 11/1939 | Willson | 52/384 |
| 3,444,660 | 5/1969 | Feichter et al. | 52/385 X |
| 3,533,206 | 10/1970 | Passeno, Jr. | 52/387 |
| 3,621,625 | 11/1971 | Medow | 52/314 |
| 3,723,233 | 3/1973 | Bourke | 52/806 X |
| 3,757,481 | 9/1973 | Skinner | 52/309.17 X |
| 3,817,012 | 6/1974 | Wack et al. | 52/385 X |
| 3,950,202 | 4/1976 | Hodges | 52/612 X |
| 3,963,846 | 6/1976 | Bourke | 52/309.14 |

Primary Examiner—Alfred C. Perham
Attorney, Agent, or Firm—Peter L. Berger

[57] ABSTRACT

An assembly system for attaching marble panels to walls is illustrated in which individual marble panels are formed of a thin marble layer attached to a carrier with the carrier being formed of a tongue groove assembly. Adjoining panels are interfit with each other, and this assembly system allows for relatively foolproof installation of marble walls.

11 Claims, 8 Drawing Figures

FIG.2
FIG.6
FIG.7
FIG.8
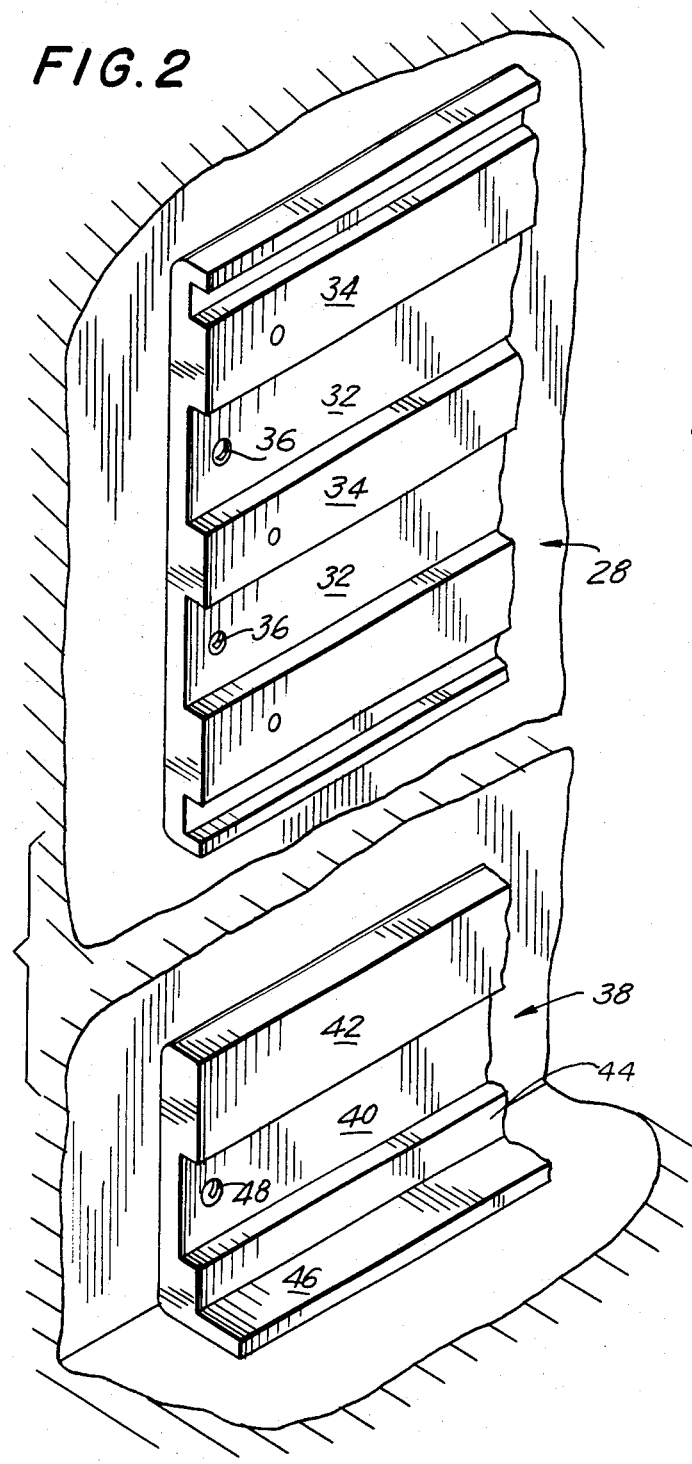
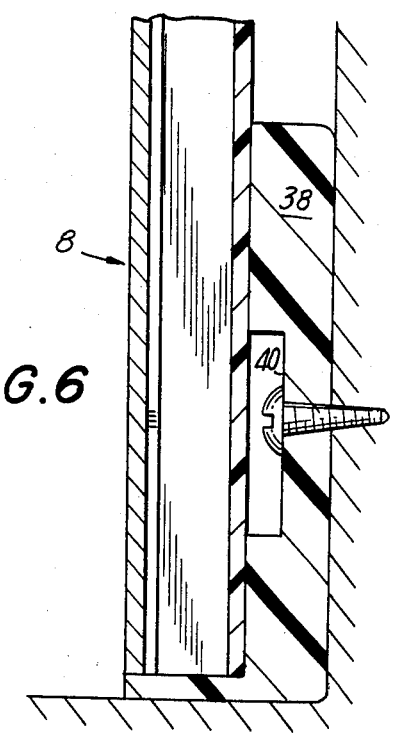
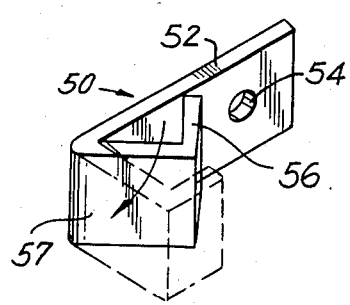
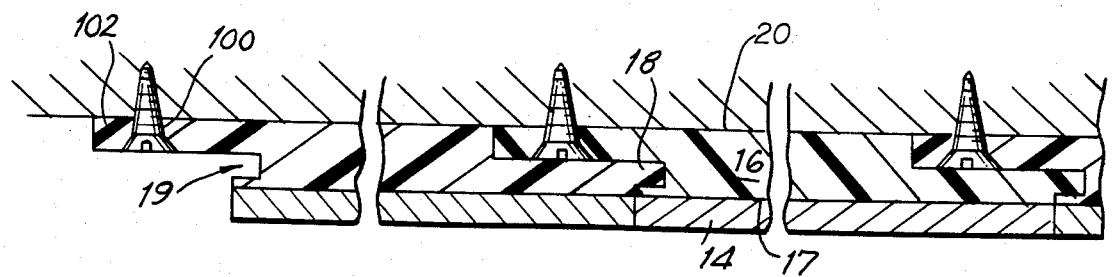

ASSEMBLY SYSTEM FOR INSTALLING MARBLE PANELS

BACKGROUND OF THE INVENTION

This invention relates to the assembly of marble walls, and to the replacement of marble slabs for such installation.

Marble panels and walls have always been a desirable architectural and interior design feature. Conventionally, such marble panels are provided either by a solid marble slab which must be secured to a flat surface. A skilled artisan is required to handle the slab and to secure it to the flat surface without cracking or breaking the marble. Obviously, this is a time consuming and expensive process, and the damage to marble slabs which occurs is a very expensive problem.

One attempt to eliminate the need of such an assembly procedure has been to provide materials made of plastic which are marble look-alikes and which are assembled as squares on a wall surface. Obviously, such squares do not resemble a marble panel, and the undesirability of such squares as a replacement for natural marble is quite clear.

U.S. Pat. No. 3,963,846 entitled Marble-Faced Composite Surface Element discloses a composite marble panel formed of a thin marble layer attached to a honeycomb backing structure. This composite panel is difficult to assemble and also leaves unfinished edges.

An object of this invention is to provide a marble panel and assembly system which enables whole marble panels of the size of a natural marble slab to be installed without requiring skilled artisans.

Another object of this invention is to provide such an assembly system which is relatively foolproof, simple to use and easily adaptable to on-site installation.

Still another object of this invention is to improve the time and efficiency of installation of marble walls which materially can reduce the installation cost.

Yet another object of this invention is to provide such a system in which cracking and breaking of marble slabs is eliminated, yet in which marble walls are installed with the apparent thickness of marble slabs.

Another object of this invention is to provide a marble panel which only has a thin marble layer but which has substantially finished side edges.

Other objects, advantages and features of this invention will become more apparent from the following description.

SUMMARY OF THE INVENTION

In accordance with the principles of this invention, the above objects are accomplished by providing a marble panel formed of a marble sheet and a mounting carrier secured thereto, the mounting carrier being substantially coextensive with the sheet of marble. The individual marble panels are formed so that a tongue-in-groove arrangement is provided in the mounting carrier so as to have adjoining marble panels interlock with each other. Apertures are provided in the tongues of the carriers to ensure that adjoining panels are accurately located next to each other to assist in the installation of the marble panels.

The carriers may be formed of molded plastic members with the tongue-in-groove constuction molded therein. The carriers also may be solid or be formed holow with an internal web construction provided for structural strength.

The installation system of this invention further includes intermediate assembly panels which themselves are attached to the wall. These intermediate assembly panels are provided with alternating rows of recessed and flat mounting surfaces. The intermediate assembly panels are attached to the flat wall or surface through the recessed surfaces, while the front mounting surfaces are flush with the individual marble panels. A bottom intermediate assembly foot panel is also provided which provides vertical support for the marble panel. The apertures in the tongue of the carrier align with apertures in the mounting surface of the intermediate assembly panels to ensure that the marble panels are accurately installed. As may be seen, such a foolproof arrangement eliminates the need for skilled artisans to do the installation, and the effectiveness, efficiency and cost of such installation is materially improved.

BRIEF DESCRIPTION OF THE DRAWING

FIG. 2 is a perspective view of an intermediate and lower panel assemblies.

FIG. 6 is a sectional view along lines 6—6 of FIG. 4 showing a kickplate section.

FIG. 7 is a perspective view of a corner clip used in the assembly procedure of this invention.

FIG. 8 is a sectional view of another embodiment of a marble panel.

DETAILED DESCRIPTION

Figure 1:
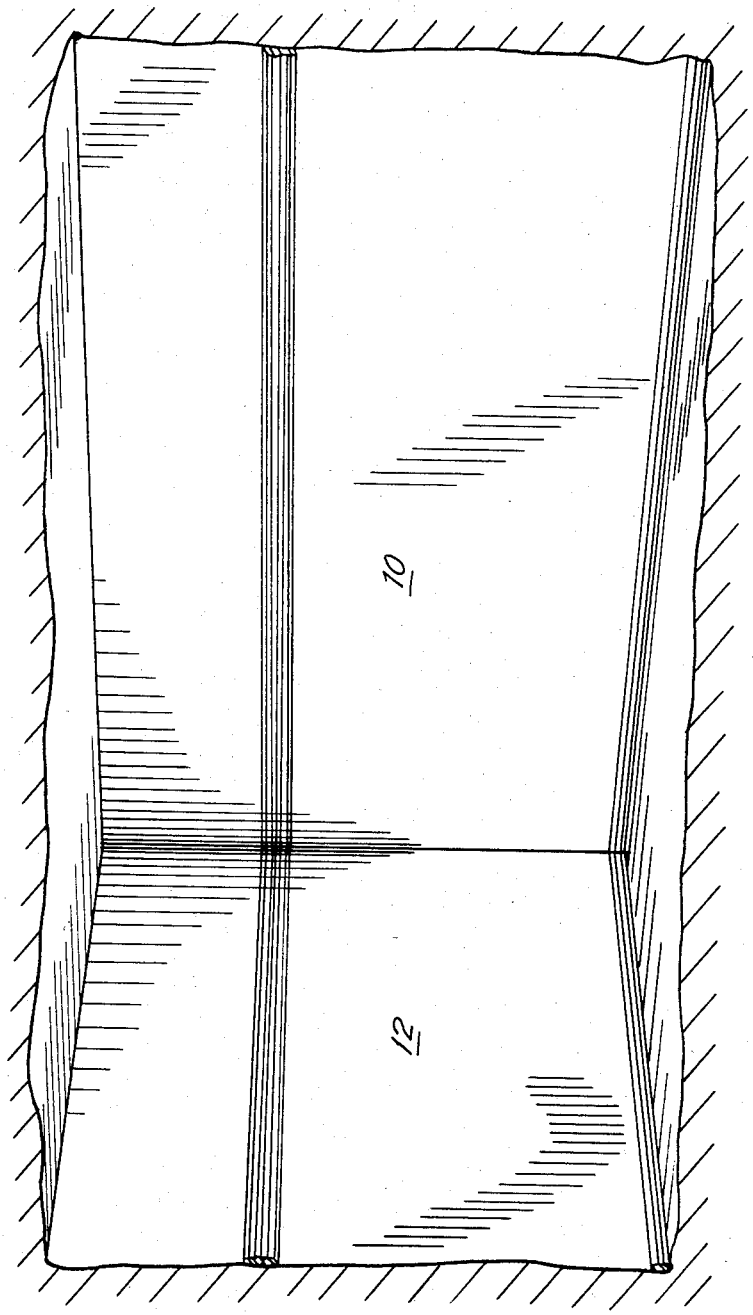
FIG. 1 is a perspective view of a front and side wall to which the intermediate carriers are attached.

The marble panels 8 illustratively are to be installed on a front wall 10 and a perpendicular side wall 12. FIG. 8 illustrates one embodiment for a marble panel which comprises a layer 14 of marble attached to a solid mounting carrier 16, the carrier comprising a tongue 18 and groove 19 assembly to enable adjoining marble panels to fit and interlock one in the other to ensure abutting of adjoining panels. Solid mounting carrier 16 comprises a front attaching surface 17 coextensive with the marble sheet or layer 14 and a rear mounting surface 20 parallel to the front surface 17.

The carrier 16 may alternatively be formed of a series of support webs 22 (see FIG. 3) to which a rear mounting surface 26 is attached. Marble panel 14 is attached to the feet 49 of webs 22 which form a discontinuous front attaching surface. The tongue 18 and groove 19 may be molded of plastic. The entire carrier assembly of FIG. 3 may be manufactured of molded plastic by providing a mold and injecting a plastic material to form the panel shown in FIG. 3. Whether the panel is an integrally molded structure or a composite structure, it may be seen that the edges 27 of the carrier panel 16 are finished and may be clad with marble strips. The marble layer 14 is attached to carrier panel 16 and is coextensive therewith.

Once the individual marble panels are assembled, they can then be mounted directly to the wall with mounting surface 20 or 26 bearing against the wall.

A preferred and different embodiment for a mounting system for such marble assemblies is illustrated in FIG. 2. There is shown a perspective view of an individual intermediate assembly panel 28 which may be a molded structure having parallel recessed areas 32 which alternate between parallel projecting mounting surfaces 34. The mounting surfaces 34 lie in a single plane. These molded intermediate panels 28 are attached to wall 10 through apertures 36 in the recessed portions 32. The intermediate assembly panels 28 are level with respect to the floor, and once so assemblied, the individual marble panels 8 can be attached to the wall.

An intermediate foot panel 38 comprises a recessed area 40 between two projecting mounting co-planar surfaces 42 and 44. Recessed and projecting portions 42 and 44 are parallel and arranged in rows. A bottom support lip 46 is also provided in foot panel 38 to provide support for the individual marble panels attached to the intermediate assembly panels 28.

Once the intermediate assembly panels are attached to the walls, the individual marble panels are then attached to the intermediate assembly panels by utilizing apertures 100 provided in the extensions 102 on the sides of the carriers containing grooves 19. Intermediate assemblies panels 28 and 38 may be formed of unitary members of a molded plastic material.

Figure 3:
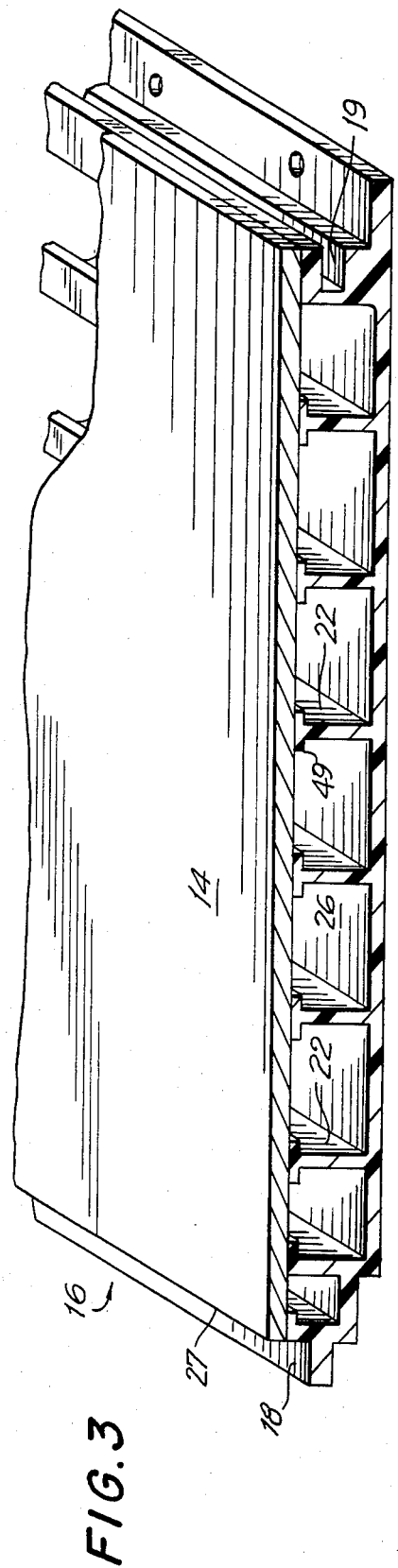
FIG. 3 is a perspective view of a marble panel attached to a carrier.
Figures 4, 5:
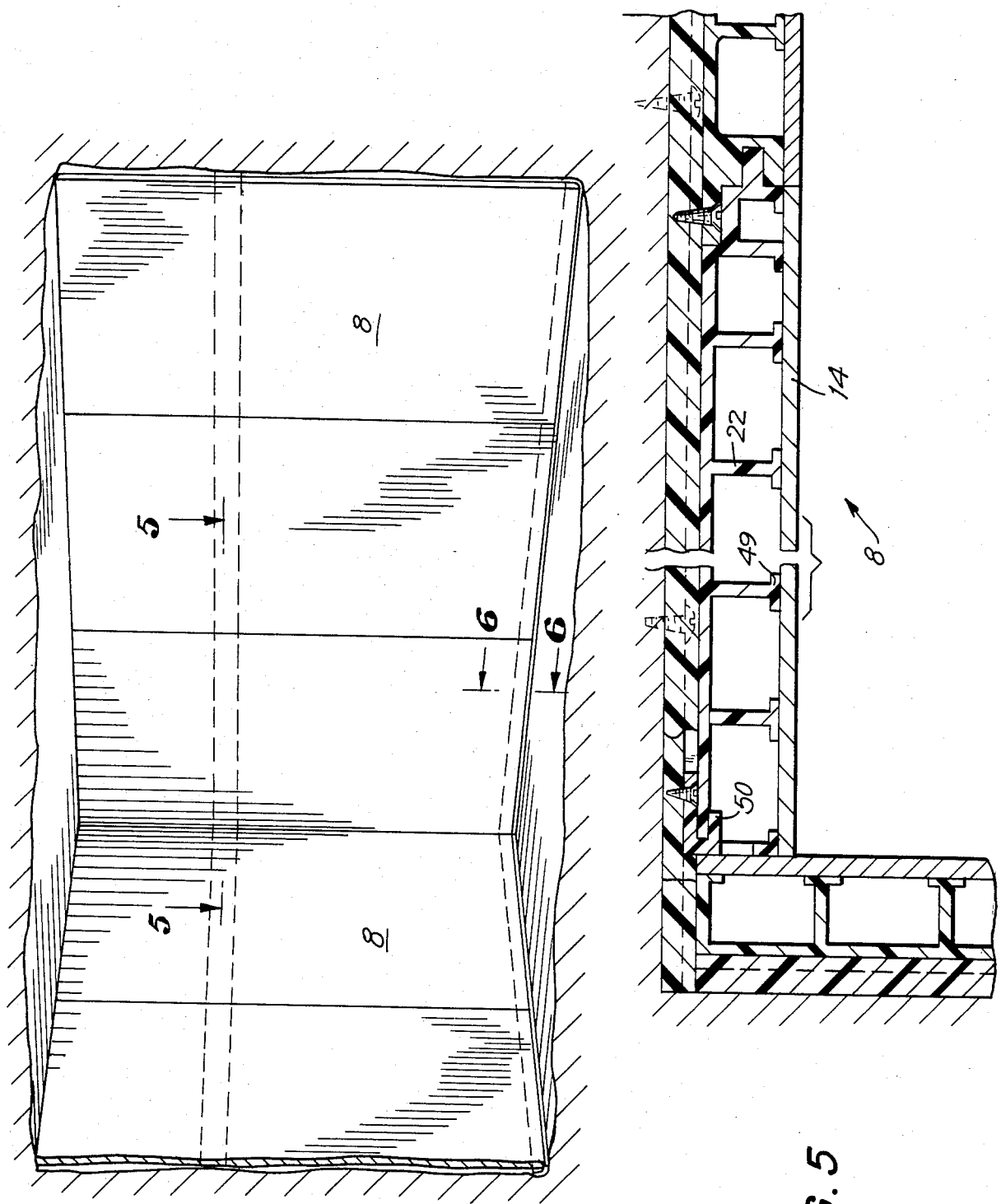
FIG. 4 is a perspective view of the front and side wall assembled.
FIG. 5 is a sectional view taken along lines 5—5 of FIG. 4 showing the installation of the marble panels to the intermediate assembly and wall.

FIG. 5 illustrates using the embodiment of FIG. 3 for an individual marble panel which includes the substantially hollow carrier 16, the mounting surface 26 adapted to be mounted against the intermediate panels or to the wall surface. The plurality of webs 22 extend perpendicular to surface 26 and terminate in ledges 49 onto which the marble sheet 14 may directly be secured. The mounting surface 26 and webs 22 may be molded of plastic and the tongue 18 and groove 19 may also be simultaneously molded at the opposite side edges of the carrier.

To complete the assembly of the panels on the walls, corner clips 50 are provided. The corner clip 50 comprises a unitary plastic member having a rear mounting leg 52 attached to a flexible finger 56 through a base 57. The leg 52 has an aperture 54 to enable the clip to be attached to a recessed portion 32 of an intermediate panel 28. The clip is attached to the first intermediate panel attached to the side wall 12, as illustrated in FIG. 1. When so installed, the flexible finger 56 is flexed outwardly so that base 57 bears against the left portion of the marble panel installed against front wall 10. Additionally, the flexible finger 56 bears inwardly against the first marble panel installed against side wall 12, as shown in FIG. 5, and the recessed area 32 accommodates the flexible finger 56 of clip 50.

The illustration of this invention is shown above. Other modifications and changes will be obvious to those skilled in the art without departing from the teachings of this invention.

What is claimed is:

1. An assembly system for installing individual marble panels to a flat surface comprising:
   individual marble panels formed of a flat sheet of marble and a mounting carrier secured thereto,
   each said mounting carrier comprising a front attaching surface and a rear mounting surface for attachment to said flat surface, one side edge of said carrier comprising a groove and the opposite side edge comprising a tongue insertable into a groove in an adjoining marble panel,
   each said mounting carrier comprising an extension on said one side edge, said extension having apertures enabling said marble panel to be attached to said flat surface,
   said marble sheet of each marble panel being substantially coextensive with and secured to a respective front attaching surface such that side edges of each marble sheet positioned between adjacent marble sheets on said flat surface are aligned with and abut side edges of said adjacent marble sheets, when said tongues of respective mounting carriers are inserted into said grooves of adjacent mounting carriers.

2. An assembly system as claimed in claim 1, wherein said mounting carrier is solid and comprises a molded plastic member having said front attaching and said rear mounting surfaces parallel to each other.

3. An assembly system for installing individual marble panels to a flat surface comprising:
   individual marble panels formed of a flat sheet of marble and a mounting carrier secured thereto,
   said mounting carrier comprising a front attaching surface substantially coextensive with said marble sheet and a rear mounting surface for attachment to said flat surface, one side edge of said carrier comprising a groove and the opposite side edge comprising a tongue insertable into a groove of an adjoining side edge in an adjoining marble panel such that the marble sheets on said marble panels abut each other at matching side edges at said front attaching surfaces of said mounting carriers,
   said mounting carrier comprising an extension on said one side edge, said extension having apertures enabling said marble panel to be attached to said flat surface,
   said mounting carrier being substantially hollow and including a plurality of webs perpendicular to said rear mounting surface, terminating in ledges forming said front attaching surface, said flat sheets of marble being attached to said front attaching surfaces.

4. An assembly system for installing individual marble panels to a flat surface comprising:
   individual marble panels formed of a flat sheet of marble and a mounting carrier secured thereto,
   said mounting carrier comprising a front attaching surface substantially coextensive with said marble sheet and a rear mounting surface for attachment to said flat surface, one side edge of said carrier comprising a groove and the opposite side edge comprising a tongue insertable into a groove in an adjoining marble panel,
   said mounting carrier comprising an extension on said one side edge, said extension having apertures enabling said marble panel to be attached to said flat surface,
   intermediate assembly panels to be secured between said individual marble panels and said flat surface,
   said intermediate assembly panels secured to said flat surface, and said individual marble panels attached to said intermediate assembly panels,
   each said intermediate assembly panel comprising a rear surface mounted to said flat surface, a front mounting surface on which said rear mounting surface of a carrier is mounted and a recessed area through which securing means are attached to secure said intermediate assembly panel to said flat surface, said apertures in the extension of said mounting carrier being aligned with apertures in said front mounting surface of a corresponding intermediate assembly panel.

5. An assembly system as claimed in claim 4, wherein each said intermediate assembly panel comprises an unitary assembly having at least one front mounting row defining said front mounting surface and at least one contiguous recessed row defining said recessed area.

6. An assembly system as claimed in claim 4, wherein said intermediate assembly panels are attached level to said flat surface, said apertures in said extensions aligning with preset apertures in said intermediate assembly panels to ensure that said marble panels are assembled level and abutting each other.

7. An assembly system as claimed in claim 6, wherein said intermediate assembly panels are formed of plastic.

8. An assembly system as claimed in claim 4, further comprising intermediate assembly foot panels for mounting on the flat surface at floor level, each said foot panel including a support ledge for supporting the lower edge of a marble panel secured thereto.

9. An assembly system as claimed in claim 5, wherein said unitary assembly includes a plurality of alternating recessed and front mounting rows.

10. An assembly system as claimed in claim 5, further comprising at least one corner clip secured to a recessed area of an intermediate assembly panel, each said corner clip comprising a flexible outer finger, each said corner clip attached at an extreme side position of said flat surface adjacent a perpendicular second flat surface, a marble panel inserted into each said clip with said flexible outer finger holding said marble panel flat against an intermediate assembly panel which is attached to said second flat surface, each said corner clip comprising a base bearing against the marble panel secured to the first flat surface.

11. An assembly system as claimed in claim 10, wherein each said corner clip and intermediate panel are made of plastic.

* * * * *